Dec. 1, 1953  J. C. HEINTZ  2,660,767
SIPING TIRE AND APPARATUS THEREFOR
Filed Sept. 21, 1951
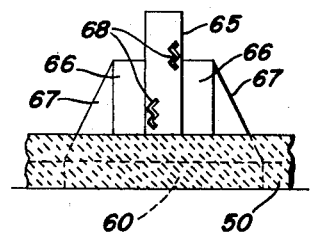
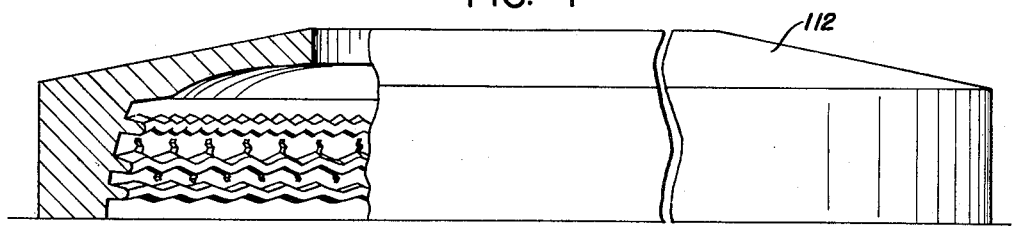
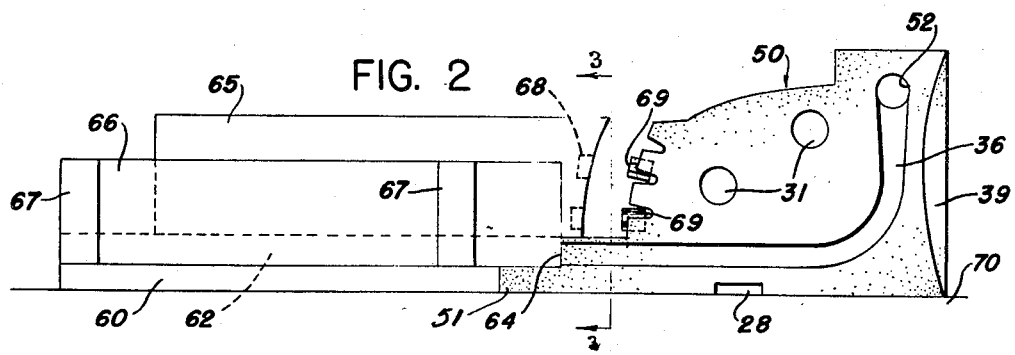
INVENTOR.
JAMES C. HEINTZ
BY
ATTORNEY

UNITED STATES PATENT OFFICE 2,660,767

SIPING TIRE AND APPARATUS THEREFOR

James C. Heintz, Lakewood, Ohio; The Cleveland Trust Company, executor of the said James C. Heintz, deceased Application September 21, 1951, Serial No. 247,727

4 Claims. (Cl. 22—9)

This invention relates to the use of plaster of Paris forms for casting tire matrices and the transfer of sipes from the forms to the matrices. More particularly it relates to siping aluminum tire matrices. However, the invention is not limited to forming sipes on aluminum matrices; and includes the casting of other metals, for example, magnesium, brass and other metals and alloys having a melting point under 1000° C. It includes process improvements and improvements in equipment.

Considerable work has been published on the use of plaster of Paris forms in the casting of aluminum, etc. Although sand has been used extensively in the casting of metals, the sand grains are relatively coarse and the castings produced have a relatively rough surface. The plaster of Paris particles are so small that the forms made from plaster of Paris have a perfectly smooth surface and metals cast adjacent to such forms require little or no machining. A very material saving in labor results, particularly where the surface of the casting bears an intricate design.

In the manufacture of tire matrices, I prefer to form the intricate tread and sidewall design in a plaster of Paris form with a flexible pad which can be made of rubber or a vinyl composition, or any flexible setting plastic. The material known as Perma-Flex cold molding compound, sold by the Perma-Flex Mold Company of Columbus, Ohio, has proved very satisfactory. The flexible forming pad is formed from any suitable pattern such as a pattern carved from hard plaster, and the plastic is brought into contact with this pattern surface and set in any usual manner, as by being poured into a cavity formed next to the surface just prior to setting. The use of flexible forming pads is not new in the art and the pad may be made in any known or novel manner.

The core box which is preferred for a tire matrix forms only a segment of the matrix and for matrices for smaller tires I prefer a 60-degree segment and a 45-degree segment for larger matrices.

After the plaster of Paris form is removed from the core box it is heated to reduce its moisture content. Runners, etc. may then be cut into the plaster of Paris form to provide for flow of the molten metal during the casting operation. In a segment to be used for molding a tire matrix, it is convenient to cut one runner into the top portion of the form from each of the radial walls, with the two runners coming together at about the centerline of the form. In two of the six 60-degree segments used to form a complete mold for a matrix for a smaller tire, a sprue or runner is cut down from the top of the form to the junction of these two runners. It is desirable to pour the metal into a plaster of Paris sprue and conduct it through plaster of Paris runners because the plaster of Paris is a very good insulating material and the metal is not appreciably cooled by contact with the plaster of Paris. A certain amount of moisture may be left in the plaster of Paris to regulate the amount the metal which contacts it is cooled. Rather than to fabricate separate plaster of Paris forms to serve as runners, I find it advantageous to cut the runners through the forms which constitute the surface of the molding cavity because these are less fragile than separate thin-walled runners which might be designed for the purpose and there is less danger of their being damaged during the pouring operation. Likewise, the time and labor required to assemble a mold are thereby minimized. Runner gates leading from these runners are cut into the radial end surfaces of the forms, and in adjacent forms these runner gates are complementary and the metal enters the molding cavity by flowing through the runner gates between adjacent forms. At the inner ends of these runner gates which are located below the bottom surface of the molding cavity are the risers through which the molten metal flows into the molding cavity. The risers are formed of plaster of Paris and are held in place by the chill ring which is of cast iron and forms the outer surfaces of the matrix which contact the shell of the tire mold. This chill ring is provided with one or more suitable openings for the placement of plaster of Paris pouring sprues. Openings for the risers are located in the chill ring at the intersections of the segmental plaster of Paris forms.

This application is a continuation-in-part of my application Serial No. 183,810 filed September 8, 1950, in which the core box and its operation are claimed. The shrinking of a hot newly cast object over a sizing form is claimed in my application Serial No. 247,729 filed September 21, 1951. The method of casting with a plaster of Paris sprue and runner, and with a design in a plaster of Paris mold and a metal chill element, and apparatus therefor are claimed in my application Serial No. 247,728 filed September 21, 1951.

The invention will be further described in connection with the accompanying drawings in which—

Fig. 1 is a side view, partly broken away, of the finished matrix;

Fig. 2 is a side view of the equipment for inserting sipes; and

Fig. 3 is a view on the line 3—3 of Fig. 2.

SIPES

The drawings illustrate the method of siping and preferred equipment therefor. The metal sipes are pressed into the plaster of Paris form preferably before drying. They are not pressed flush with the surface of the form but a certain area approaching half the area of each sipe is left exposed. When the metal poured around this exposed portion of the sipe is allowed to cool, the sipe becomes embedded in the metal so that when the plaster of Paris form is destroyed the metal sipes are held by the matrix. The siping equipment and operation are illustrated in Figs. 2 and 3. The sipes may be inserted by hand and at any desired angle to the surface.

The siping equipment includes a base plate 60 which is equal in height to the lip 51 on the plaster of Paris form. Above the baseplate is a plate 62 which projects over the bottom lip 51 of the plaster of Paris form. It rests against the end wall 64 of the form and stands somewhat higher than this wall. The inner edges of both plates 60 and 62 are preferably circular so that they fit flush against the circular surfaces of the lip 51 and wall 64 of the form. The metal plates 65 slides back and forth on the plate 62, between the the blocks 66 which are supported by the triangles 67. Openings 68 in the end of the metal plate 65 are the shape of the sipes 69 and are adapted to hold sipes at just the height desired for placement in the plaster of Paris form. The sipes are placed in the openings 68 when the metal plate 65 is pulled away from the plaster of Paris form. The plate 65 is then pushed flush against the plaster of Paris form and the sipes are pressed into the plaster of Paris and held by it so that when the plate 65 is slid back again the sipes remain in the plaster of Paris.

After the completion of one siping operation the siping equipment is slid on the surface 70 to a new position, supplied with fresh sipes, and the siping operation is repeated. Thus the metal plate 65 is operated toward and away from the plaster of Paris form in different radial positions until sipes have been inserted in the desired positions around the entire tread surface of each form. Different metal plates with openings properly spaced are used for matrices with different tread designs.

Fig. 1 illustrates the finished cast matrix, showing how the sipes remain partially embedded in the metal and partly exposed, after the plaster of Paris is removed.

It is necessary that the several plaster of Paris forms be correctly positioned in order to have an annular mold cavity. By correctly locating the forms and removing any excess plaster, as may be required, the surface of the tread of the matrix may be made circular with a variation of less than a ten thousandth of an inch. This is accomplished without any machining or other finishing of the matrix. The method of positioning the forms and the apparatus used therefor are described and claimed in my application Serial No. 379,949 filed September 14, 1953. There are no unfinished matrices now on the market which do not vary as much as several thousandths of an inch or more.

After the plaster of Paris forms are put in position the chill ring is lowered into place. The inner surface of the chill ring is first covered with China clay. This is done by heating the ring up to about 200° F. in an oven and then spraying it with a water suspension of the China clay. The China clay adheres to the iron as it dries. The plaster of Paris pouring sprues are then put in place. One spraying serves for several castings.

Various aluminum alloys are available for casting tire matrices. An alloy of 95 per cent aluminum and 5 per cent silicon has been used satisfactorily, but others may be used as satisfactorily.

The aluminum is melted and poured at about 1250° F. (Its melting point is about 1100° F.) This is a higher temperature than would be permissible if the mold were formed entirely of plaster of Paris. Using molds composed entirely of plaster of Paris the metal cools slowly, and the gas generated forms a porous product. Using a chill ring the metal is poured at a higher temperature and cools rapidly, and sets in a nonporous condition.

As the cavity fills with the hot molten aluminum, the chill ring chills the aluminum and it sets first around the outer edge of the matrix, and as the setting progresses inwardly the gases in the metal are forced out, forming a dense, nonporous casting. The moisture left in the plaster of Paris hastens the cooling of the metal, but steam which is generated from this moisture is removed from the metal with the gases, as the metal sets. The fact that the plaster of Paris is a good insulator and prevents the metal adjacent it from setting until the opposite surface of the casting adjacent the chill ring has cooled and set, permits the expulsion of the gases from the metal as it sets.

After the metal has solidified, the plaster of Paris forms are broken away from the matrix and with the use of an air hose all plaster of Paris adhering to the matrix is removed, such as that which may adhere to the sipes or in the grooves in the tread. The finished matrix is shown in Figure 1.

What I claim is:

1. Equipment for siping the tread-forming element of a tire mold, which includes a base member with a horizontal surface thereon, guide members fastened to the base member and a sliding member therebetween whereby the sliding member may be slid back and forth horizontally over the horizontal surface, one end of the sliding member being adapted to be slid to a position beyond the edge of the base member, said edge of the base member being an arc with its center off the base member in the direction in which the sliding member is slid to bring its end beyond the edge of the base member as aforesaid, and a sipe-shaped slit extending horizontally into said end of the sliding member adapted to hold a sipe.

2. The method of casting the tread-forming element of a tire mold, which comprises making several plaster of Paris sectors; pressing into the sectors at a plurality of locations, while the plaster of Paris is still wet, portions of tread-depression-forming elements while leaving the balance of the elements protruding from the plaster of Paris; drying the plaster of Paris sectors; then using the plaster of Paris sectors to bound the tread-forming portion of a mold cavity in which the mold is to be cast, said balance of the elements protruding from the plaster of Paris into the cavity; and then casting aluminum or like metal in the cavity around the protruding portions of said elements thereby embedding said protruding portions in the metal; and then after the metal has cooled, removing the plaster of Paris and obtaining the tread-forming element of the mold from which protrude the portions of the elements which were originally embedded in the plaster of Paris.

3. The method of casting the tread-forming element of a tire mold which comprises making several plaster of Paris sectors, moving tread depression-forming elements in series radially toward each sector while still wet along a given line which passes through the center of the sector while interruptingly changing the radius of said movement with respect to the sector, and at each interruption pressing a portion of a different series of elements into the wet plaster of Paris while leaving the balance of the elements protruding from the plaster of Paris, drying the sectors, then using the sectors to form the inner wall of an annular mold cavity in which the mold is to be cast, said balance of the elements protruding from the plaster of Paris into the cavity, and then casting aluminum or like metal in the cavity around the protruding portions of said elements thereby embedding said protruding portions in the metal, and then after the metal has cooled, removing the plaster of Paris and obtaining the mold from which protrude the portions of the tread-depression-forming elements which were originally embedded in the plaster of Paris.

4. The method of casting the tread-forming element of a tire mold which comprises making several plaster of Paris sectors, moving sets of sipes radially toward each sector along a given line which passes through the center of the sector while interruptingly changing the radius of said movement with respect to the sector, and at each interruption pressing a portion of a different set of sipes into the plaster of Paris while leaving the balance of the sipes protruding from the plaster of Paris, using the sectors to form the inner wall of an annular mold cavity, said balance of the sipes protruding from the plaster of Paris into the cavity, casting molten metal in the cavity around the protruding portions of said sipes thereby embedding said protruding portions in the metal, and then after the metal has cooled, removing the plaster of Paris and obtaining the mold from which protrude the portions of the sipes which were originally embedded in the plaster of Paris.

JAMES C. HEINTZ.

References Cited in the file of this patent

UNITED STATES PATENTS

| Number | Name | Date |
|---|---|---|
| 1,440,040 | Wahlen | Dec. 26, 1922 |
| 1,756,602 | Morris et al. | Apr. 29, 1930 |
| 1,862,908 | Richardson | June 14, 1932 |
| 2,170,226 | Watt | Aug. 22, 1939 |
| 2,220,703 | Bean | Nov. 5, 1940 |
| 2,263,001 | Gunsaulus | Nov. 18, 1941 |
| 2,575,865 | Dazeley | Nov. 20, 1951 |